United States Patent [19]

Sachs et al.

[11] 3,787,204

[45] Jan. 22, 1974

[54] PRODUCTION OF COMPOSITE MATERIALS CONTAINING COATED INORGANIC FIBERS

[75] Inventors: Kurt Sachs, Brierley Hill; Frederick Arthur Foreman, Stafford; John Barlow, Wolverhampton, all of England

[73] Assignee: G.K.N. Group Services Limited, Smethwick, Warley, England

[22] Filed: July 22, 1971

[21] Appl. No.: 165,369

[30] Foreign Application Priority Data
July 24, 1970 Great Britain.................... 35932/70

[52] U.S. Cl....................... 75/212, 75/211, 75/226, 75/DIG. 1
[51] Int. Cl............................................... B22f 1/00
[58] Field of Search ......... 75/DIG. 1, 211, 212, 226

[56] References Cited
UNITED STATES PATENTS

| | | | |
|---|---|---|---|
| 3,653,882 | 4/1972 | Petrasek et al. ....................... | 75/211 |
| 3,475,168 | 10/1969 | Battista et al. ......................... | 75/212 |
| 2,119,488 | 5/1938 | Padowicz .............................. | 75/212 |
| 3,282,658 | 11/1966 | Wainer ........................... | 75/DIG. 1 |

FOREIGN PATENTS OR APPLICATIONS 386,499  1/1933  Great Britain........................ 75/212

*Primary Examiner*—Benjamin R. Padgett
*Attorney, Agent, or Firm*—Holman et al.

[57] ABSTRACT

A method of making a composite material comprising a metal matrix reinforced with fibres including the steps of producing an intimate mixture of fibre reinforcement and an organic acid salt of a metal, the salt being such that it can be decomposed on heating to form the metal, heating the intimate mixture so that the salt decomposes to give the metal in finely divided form and then applying pressure to the resulting mixture under temperature conditions to form a consolidated matrix reinforced by the fibres.

The organic acid salt may be lead formate.

13 Claims, No Drawings

PRODUCTION OF COMPOSITE MATERIALS CONTAINING COATED INORGANIC FIBERS

BACKGROUND OF THE INVENTION

This invention relates to a method of making a composite material comprising a metal matrix reinforced with fibres.

SUMMARY OF THE INVENTION

An object of the present invention is to provide a new and improved method of making a composite material comprising a metal matrix reinforced with fibres.

According to the present invention we provide a method of making a composite material comprising a metal matrix reinforced by fibres which includes the steps of:

producing an intimate mixture of fibre reinforcement and an organic acid salt of a metal, which salt is such that it can be decomposed on heating to form the metal, heating said intimate mixture under conditions in which the salt decomposes to give the metal in finely divided form and applying pressure to the resulting mixture under temperature conditions so as to obtain a consolidated matrix reinforced by the fibres.

The composite material may be used as a bearing material.

The heating of the intimate mixture of fibres and metal salt is preferably effected in a reducing or non-oxidising atmosphere.

The term "metal salt" is used herein to refer to a single metal salt as well as a mixture of metal salts and in this latter case an alloy matrix may be obtained in the resultant composite.

The intimate mixture of the fibrous reinforcement and the salt is preferably obtained by precipitation of the salt from a solution in which the fibrous reinforcement is dispersed.

The solution may be a solution of the salt and the salt may have less solubility at low temperature than at high temperature and the salt being caused to precipitate from the solution by lowering the temperature of the solution.

Alternatively, the salt may be precipitated from a suitable solution by the addition of an appropriate organic acid to the solution.

For example, the solution may be lead acetate and the organic acid may be formic acid.

DESCRIPTION OF THE PREFERRED EMBODIMENTS

Two methods of making a composite material embodying the present invention will now be described in more detail by way of example.

In the first example carbon fibres were placed in a vessel containing a solution of lead acetate and a wetting agent, the amount of carbon fibre was selected so that, in the eventual composite, there was 10 percent by volume carbon fibre.

Twice the stoichiometric amount of formic acid was then added and this gave complete precipitation of lead formate. It has been found that it is desirable that at least one molar equivalent of free formic acid remains at the end of precipitation in order to achieve a speedy and effective precipitation.

The precipitate of lead formate containing dispersed carbon fibres was then filtered and dried to obtain a dry intimate mixture of carbon fibres and lead formate. This mixture was then heated to 280° C in a hydrogen atmosphere as a result of which the lead formate decomposed to give finely divided lead. The mixture may be heated at a temperature lying in the range 220° to 280° C if desired.

The mixture of carbon fibres and finely divided lead was then placed in a die set and pressure applied to the mixture. The pressing operation was carried out at a termperature of 250° C and at a pressure of 10 tons per square inch. It has been found that the pressing operation is preferably carried out at a temperature lying approximately in the range 5 to 20 tons per square inch and at a temperature lying in approximately the range 220° to 280° C but the pressing temperature can be increased up to about 300° C. The higher is the pressing temperature then the lower the applied pressure required.

A sample of the material of the above example was subjected to a punch shear test.

This test provides a means for assessing the ultimate strength of the material subjected to shear loading. The test is carried out on a Hounsfield tensometer and a steel punch is forced through a disc of the material and the maximum load ($p$) is recorded. The shear strength ($S$) is then obtained from the formula $$S = P/\pi\, dt$$

where $t =$ thickness of the disc (mm) and
$d =$ diameter of the punch (mm)

A disc of material made in the above example was compared with a disc of normal lead in the form of rolled sheet.

| Material | % Theoretical Density | Punch Shear Strength (N/mm²) |
| --- | --- | --- |
| Chemical lead (rolled sheet) | 100 | 13.2* |
| Lead + 10 vol % short carbon fibres | 93 | 34.2* |

The punch shear strengths provided in the table are the mean of 10 results for each material.

In a second example of the invention, the process described above was modified in that the intimate mixture of lead formate and carbon fibre was obtained by placing the carbon fibres in a vessel containing a hot saturated solution of lead formate at a temperature of 100° C the solution of lead formate having been made up previously in any desired manner. The solution was then allowed to cool to the room temperature, during which lead formate was precipitated out on to and around the carbon fibres due to the fact that the solubility of lead formate is very low at room temperature whereas at an elevated temperature of approximately 100° C it has a relatively high solubility.

In all other respects the process of the second example is as described in connection with the first example.

If desired, in the processes discussed above, instead of using carbon fibres silicon carbide whiskers, silicon nitride, boron, boron nitride, silica fibres, asbestos fibres and other suitable reinforcing fibres/whiskers can be used.

Although the invention has been described in detail above in relation to composites in which the matrix was of lead, other matrix materials which may be used include cobalt, copper, iron, zinc, nickel, silver, bismuth, cadmium, silver and gold or alloys thereof.

The metals may be made from the appropriate formate, oxalate or tartrate. In the case of silver there is, however, a risk of explosion with certain organic acid salts and in the case of this metal the lactate and tartrate are preferred whilst in the case of zinc it is thought that the lactate could also be used.

It has been found that certain of the above mentioned metals, when made from certain of the compounds, for example lead when formed from lead tartrate, and cobalt when formed from cobalt oxalate are pyrophoric. In such cases it is necessary to take adequate precautions and this may involve carrying out the pressing operation in a protective atmosphere, for example in argon atmosphere.

We claim:

1. A method of producing a composite material comprising a metal matrix reinforced by inorganic fibres wherein the improvement comprises performing the steps of:

dispersing the inorganic fibers in a solution of a salt of the metal, performing a precipitation operation to precipitate a decomposable organic acid salt of the metal onto the fibers to produce an intimate mixture of the inorganic fibers and the decomposable salt, heating said intimate mixture in a non-oxidizing atmosphere to decompose the salt and to produce an intimate mixture of the inorganic fibers and the metal in finely divided form, and applying pressure to the mixture so obtained at a temperature sufficient to obtain a consolidated matrix reinforced by the fibers.

2. A method according to claim 1, wherein the heating of the intimate mixture of fibres and metal salt is effected in a reducing atmosphere.

3. A method according to claim 1, wherein a mixture of metal salts is used to provide an alloy matrix in the resultant composite.

4. A method according to claim 1, wherein the solution is a solution of the decomposable salt and the decomposable salt has a solubility which is less at low temperature than at high temperature and wherein the decomposable salt is caused to precipitate from the solution by lowering the temperature of the solution.

5. A method according to claim 1, wherein the decomposable salt is caused to precipitate from the solution by the addition of an appropriate organic acid to the solution.

6. A method according to claim 1, wherein the fibres are selected from the group consisting of carbon fibres, asbestos fibres, alumina whiskers, silica fibres, silicon nitride fibres, boron fibres, and boron nitride fibres.

7. A method according to claim 1, wherein the matrix is selected from the group consisting of lead, cobalt, copper, zinc, silver, gold, nickel, bismuth, cadmium and alloys thereof.

8. A method according to claim 1, wherein the composite material is a bearing material.

9. A method according to claim 8, wherein the fibres are selected from the group consisting of carbon and asbestos fibres and the matrix is selected from the group consisting of lead and silver.

10. A method according to claim 1, wherein the organic acid salt is selected from the group consisting of a formate, an oxalate and a tartrate.

11. A method according to claim 1, wherein the organic acid salt is selected from the group consisting of silver lacetate, silver tartrate and zinc lactate.

12. A method according to claim 1 wherein the matrix is lead and the intimate mixture of fibre and decomposable organic acid salt is heated to a temperature lying in the range 220° to 280° C and is subjected to a pressing operation at a temperature lying in said range and at a pressure lying approximately in the range 5 to 20 tons per square inch.

13. The method according to claim 6 wherein the solution is lead acetate and the organic acid is formic acid.

* * * * *